United States Patent Office 2,751,422
Patented June 19, 1956

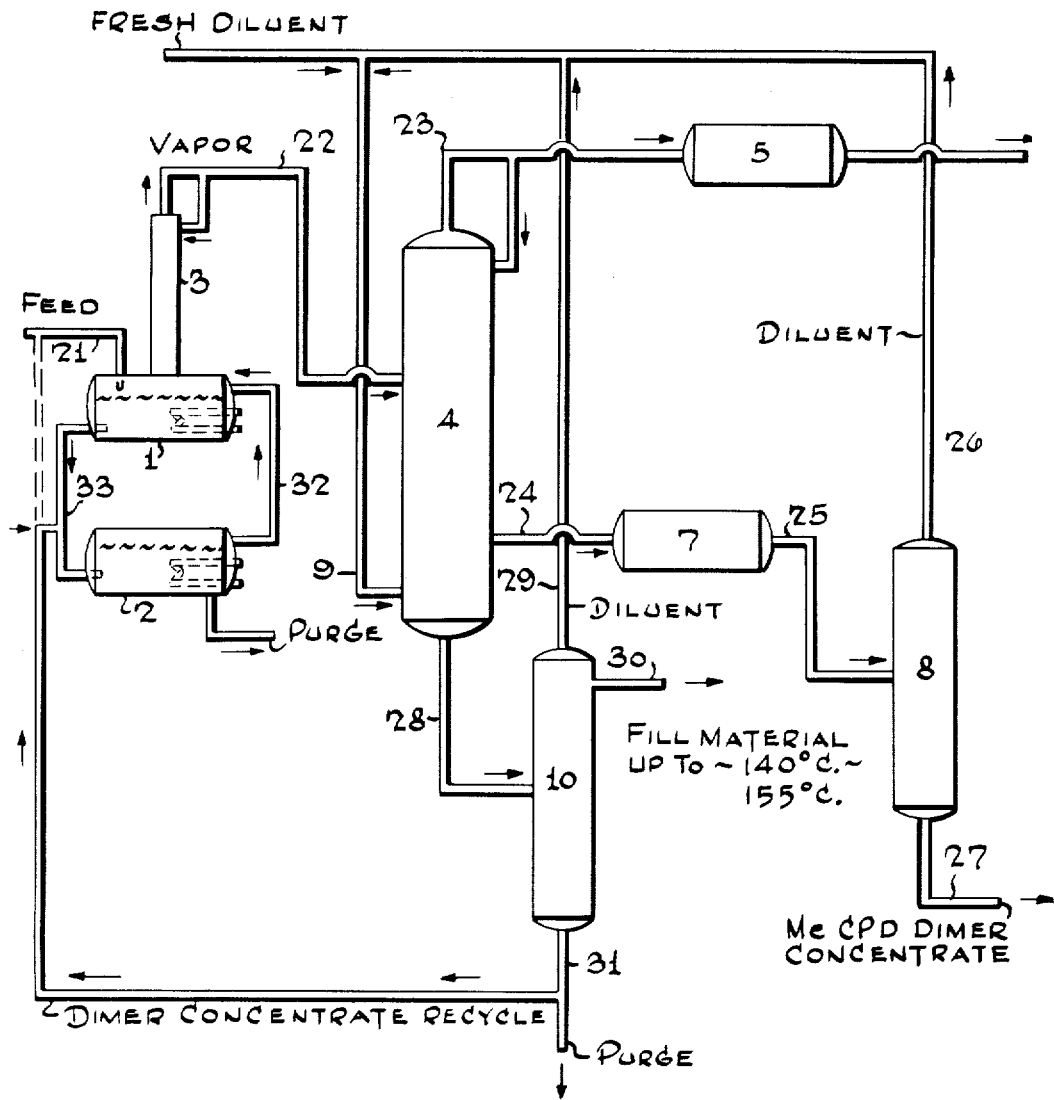

2,751,422
PROCESS FOR RECOVERY AND PURIFICATION OF CYCLODIENES FROM CRUDE PETROLEUM

Joseph F. Nelson, Rahway, Fred W. Banes, Westfield, and Addison W. Hubbard, Elizabeth, N. J., assignors to Esso Research and Engineering Company, a corporation of Delaware Application June 18, 1952, Serial No. 294,162

6 Claims. (Cl. 260—666)

This invention relates to a process for separately recovering the high-purity dimers of cyclopentadiene and methylcyclopentadiene from petroleum streams containing a complex mixture of cyclo-alkadiene dimers and codimers.

Highly cracked petroleum fractions, as is well known in the art, contain a variety of cyclodiene compounds— for example, the monomers of $C_5$ and $C_6$ cyclopentadienes, their higher homologs, also, the dimers, codimers, higher polymers of these homologous cyclodienes, and interpolymers with other diolefins. The dimer and codimer forms are stable at ordinary atmospheric temperatures, but on being heated to elevated temperatures of the order of 140° C. and higher they start to undergo cracking or depolymerization. The monomeric forms are unstable even at ordinary temperatures and undergo rapid polymerization in the range of 25°–120° C.

A typical steam cracking operation, which is not part of this invention but is given for background and illustrative purposes only, thus comprises cracking petroleum hydrocarbons boiling in the range of 250°–700° F. in the vapor phase at 1000° F. to 1600° F. for a short period of 1 to 5 seconds, preferably in the presence of 50 to 90 mole per cent steam based on the hydrocarbon feed and under pressure of 1 to 10 atm. The naphtha distillate distilled from the cracked petroleum will be of approximately $C_1$–$C_{16}$ range and will contain $C_5$ and $C_6$ cyclopentadienes in various forms, monomers, dimers, and codimers, together largely with unsaturated aliphatic hydrocarbons and aromatic hydrocarbons within this range.

The naphtha distillate is treated by distillation, etc., to remove the lower and higher boiling fractions by means known in the art (e. g., see U. S. Patent No. 2,511,936).

This leaves fractions of crude cracked petroleum naphtha boiling in the approximate range of $C_5$ (15° C.) to 150° C. and higher, which are then thermally soaked for 4 to 8 hours at temperatures from about 100°–140° C. This converts any cyclopentadiene monomers in the naphtha to dimer and codimer forms. The soaked material is then steam or vacuum stripped to remove $C_5$–$C_9$ components, leaving as residue a concentrate containing from 55 to 82 weight per cent of cyclopentadiene plus methylcyclopentadiene present as dimers and codimers and boiling in the range of about 130°–280° C., 75% or more boiling in the range of about 170°–225° C. It is this concentrate that preferably represents the feed stock for the present invention. The process is applicable to feed stocks containing as little as 20 weight per cent cyclopentadiene and methylcyclopentadiene as dimers and codimers or as high as 93% on the same basis.

In the past many sequences of operations were attempted in order to recover these cyclodiene fractions economically, but all resulted in obtaining cyclopentadiene fractions containing large quantities of methylcyclopentadiene.

It is desirable to separate these materials for organic synthesis purposes so as to develop new fields of use. Thus, for example, in the fields of insecticides and resins one of the homologs, i. e., the cyclopentadiene, has a distinct utility, where the other at present does not. It is important, therefore, to have relatively pure fractions of one as compared to the other.

Little has been done commercially, however, on the separation of cyclopentadiene from methylcyclopentadiene. The difficulties reside in the fact that the cyclopentadiene and methylcyclopentadiene monomers dimerize and the dimers themselves dedimerize at approximately the same rate and temperatures.

This invention provides an improved method for recovering high purity cyclopentadiene and methylcyclopentadiene in separate fractions from cracked petroleum streams containing them. The method comprises thermally cracking by any suitable means known in the art the dimer concentrate feed stock of this invention. This cracking can be either liquid or vapor phase. The cracked material containing the cyclopentadiene and methylcyclopentadiene monomers is then fed to a fractionating zone. The fractionation in this zone takes place in the presence of an inert organic diluent which maintains the reboiler temperature at 140° C., preferably 130° C., or lower, to prevent recracking of any cyclopentadiene dimers present. The pure cyclopentadiene monomer is taken overhead and the methylcyclopentadiene monomer is withdrawn at a point below the feed plate along with diluent as a vapor side stream. The bottoms from the fractionating zone can then be recycled to the cracking stages or returned to a fractionator which removes $C_5$–$C_9$ components. It is important that the inert diluent be removed from this bottoms fraction prior to its being recycled to the cracking stages, otherwise an undesirable buildup in the cracking stages will result.

This invention will be better understood by reference to the flow plan shown in the drawing.

The feed stock for this invention is fed through line 21 to the first stage of a liquid phase cracking section 1, which is operated at a temperature of about 190°–210° C. The cracking section is also provided with a second cracking stage 2 operated at substantially higher temperatures, i. e., 200°–240° C., in order to complete the cracking of the cyclodiene dimers. The vapor overhead from cracking stage 1 is fed through a short fractionator unit 3 which holds back uncracked dimers and higher boiling fill material (non-cyclopentadiene constituents in the feed boiling in and above the range of the cyclodiene dimers). The vapor taken overhead, which has a boiling point range of about 40°–160° C., but predominantly 40°–80° C., through line 22 from fractionator 3 comprises primarily cyclopentadiene and methylcyclopentadiene and minor amounts of $C_5$ acyclic dienes, $C_7$ cyclopentadienes, and fill material boiling up to about 150°–160° C. or somewhat higher. This stream, liquid or vapor, in this illustration vapor, is fed to a fractionating column 4.

The vapor entering column 4 is fractionated to concentrate cyclopentadiene, which is taken off as an overhead product at an overhead temperature of about 41°–42° C. through line 23. This overhead product represents cyclopentadiene of about 90 weight per cent purity with acyclic $C_5$ dienes and some methylcyclopentadiene as impurities. This stream can be thermally soaked in soaker 5 for a period of 4 to 8 hours at about 100°–140° C. and then stripped of low boiling acyclic $C_5$ dienes to give a final product of 93 to 96% purity. The reason why the separation is facilitated is because the acyclic $C_5$ dienes polymerize much more slowly than the cyclopentadiene and consequently can be removed as $C_5$ monomers, while the cyclopentadiene remains as dimer. This dimer can be recracked readily if desired.

A diluent such as further detailed below is fed in at the bottom of column 4 through line 9 and tends to reflux in the column, thereby lowering the monomer concentration as well as the temperature in the column and in the reboiler of the column. As detailed further below, the use of the diluent permits of operation of the fractionating column 4 at a temperature below that which will give appreciable cracking of any cyclopentadiene dimers which are carried over or have been reformed and which may fall into the reboiler, since cyclopentadiene monomers would otherwise be produced and would contaminate the methylcyclopentadiene vapors desired to be separated therefrom. Thus the methylcyclopentadiene concentration is greatest at a point where a side stream is taken off. The side stream drawoff 24 is situated at the point at the tower where the concentration of the methylcyclopentadiene monomer is near its maximum. This will depend on column design and other variables controllable by the skilled person in the art, but is below the feed point in any case. The methylcyclopentadiene concentrate drawn off as a side stream represents primarily a mixture of methylcyclopentadiene and diluent with some small quantities of impurities such as cyclopentadiene, $C_7$ cyclopentadienes, and traces of acyclic $C_5$ dienes.

The methylcyclopentadiene fraction taken off through line 24 is thermally soaked in soaker 7 to dimerize the methylcyclopentadiene. The thermally soaked product taken off through line 25 is then fed to column 8, where the diluent is taken overhead through line 26 and recycled to the fractionating unit 4. The bottoms from column 8 taken off through line 27 is a methylcyclopentadiene dimer concentrate of about 90% purity which can be further purified and cracked in a similar manner as the concentrate treated above. The major impurities in this concentrate are the $C_7$ cyclodienes. The bottoms of column 4 is composed of 130°–160° C. fill material which is taken over to the column and mixtures of various cyclopentadiene dimers and diluent. These reboiler bottoms from column 4 are taken off through line 28 and can be recycled directly back to the cracking stages, but because the fill material and diluent present can build up to undesirable levels necessitating extremely high pressures in the cracking stages to maintain requisite cracking temperatures, it is desirable to purge or fractionate these bottoms. The latter may be done in column 10, taking off overhead through line 29 the diluent, as a side stream through line 30 material boiling up to about 155°–165° C., and a bottoms representing a concentrate of mixed dimers or codimers. This concentrate taken off through line 31 is recycled to the cracking stages, or a small part of the dimer concentrate if desired can be purged continuously or intermittently so as to prevent buildup of $C_7$ cyclopentadienes and fill material in the cracking stages. The bottoms from fractionator 10 taken through line 31 can be fed either into cracking stage No. 1 or No. 2, which are continuously connected through lines 32 and 33. Cracking stage 2 operates at a higher temperature than No. 1 and the vapor from No. 2 can be either fed directly to tower 3 or swept through the material being cracked in cracker No. 1.

Presented below are further details of this invention giving examples of the side stream compositions and further clarification of feeds and diluents employed.

Cracking temperatures of about 190°–210° C. are maintained in the first stage and about 200°–240° C. in the second stage. Pressure of 5–80# is applied if needed to maintain these cracking temperatures.

The feed stock for the process of this invention as detailed above is a cracked petroleum fraction containing preferably from about 55 to 82 weight per cent of cyclopentadiene and methylcyclopentadiene (as dimers or codimers) boiling in the range of 130°–280° C. with 75% or more boiling in the range of 170°–225° C. Further details on the components and typical actual feed composition are presented directly below:

| Composition | Range (Wt. Percent) | Typical (Wt. Percent) |
|---|---|---|
| Cyclopentadiene [1] | 33–47 | 38.5 |
| Methyl Cyclopentadiene [1] | 22–35 | 33.7 |
| $C_7$ Cyclodienes [1] | 4–9 | 6.9 |
| Acyclic Dienes [1] | 4–9 | 7.3 |
| Aromatics, Olefins, Paraffins, Diolefins, Polymers | 37–9 | 13.6 |

[1] Present as dimers and codimers.

Initial fractionator 3 is operated with a typical overhead temperature of 90°–150° C., preferably 100°–120° C.

Fractionating column 4 utilizes a feed boiling in the approximate range of 40°–160° C. with a vapor taken overhead at about 40°–43° C. and condensed vapor refluxed at 2/1 to 5/1 ratio. Typical overhead compositions are detailed below.

Overhead compositions:

| | Range (Wt. Percent) | Typical (Wt. Percent) | |
|---|---|---|---|
| | | Cyclohexene. | Ethylene Dichloride. |
| Diluent | | 90.4 | 93.3. |
| Cyclopentadiene | 88–95 | 5.2 | 1.5. |
| Methylcyclopentadiene | 6–1 | 4.4 | 5.2. |
| Acyclic Dienes | 6–4 | | |
| Cyclopentadiene Recovery | 85–90.0 | 90 | 92.3. |

A product dicyclopentadiene of 93 to 96 weight per cent or higher purity is obtained by the process of this invention.

Typical side stream compositions taken off through line 24 are presented below:

| | Range (Wt. Percent) | Typical (Wt. Percent) | |
|---|---|---|---|
| | | Cyclohexene. | Ethylene Dichloride. |
| Methylcyclopentadiene | 54–45 | 46 | 39.1. |
| Cyclopentadiene | <1 | 0.8 | 0.5. |
| $C_7$ Cyclodienes | 5–<1 | 3.9 | 3.5. |
| Acyclic Dienes | <0.50 | 0.3 | |
| Diluent | 40–55 | 49 | 56.9. |
| Methylcyclopentadiene Recovery | 70–80 | 75 | 77.2. |

After dimerizing and stripping off the diluent a concentrate containing 90.3 weight per cent methylcyclopentadiene dimer was obtained (when using the cyclohexene as the diluent). The same operation with the ethylene dichloride diluted product gave a dimethylcyclopentadiene of 91.5 weight per cent purity.

The diluent may be any one or a mixture of hydrocarbons or other inert organic materials boiling in the range of 80°–110° C. or wider boiling cuts containing them and boiling predominantly in that range, e. g., no more than 10% exceeding the upper figure, e. g., aromatics, chlorinated compounds, paraffins or naphthenic compounds. It is essential that the diluent not react with itself or with components present in the column or reboiler at the operating temperatures. A major portion of the diluent is taken off with the side stream. The quantity of diluent employed would be that required to maintain a reboiler temperature of 140° C. or preferably 130° C. or lower.

Reboiler bottoms compositions are presented below. When operating at a temperature of 140° C. or lower with a diluent:

|  | Range (Wt. Percent) | Typical (Wt. Percent) |
|---|---|---|
| Cyclopentadiene [1] | 5-10 | 7 |
| Methylcyclopentadiene [1] | 15-25 | 22 |
| Diluent | 5-30 | 12.5 |
| "Fill Material" [2] | 70-35 | 58.5 |

[1] As dimers and codimers.
[2] Includes C₇ cyclodienes, aromatics, paraffins, olefins, and diolefins. With the exception of the C₇ cyclodienes these hydrocarbons were present in the feed and boil largely in the range of 130° C.–160° C. with minor quantities present boiling as high as about 200° C.

The cyclopentadiene and methylcyclopentadiene present in the reboiler bottoms represents about 6 and 20% respectively of the cyclopentadiene and methylcyclopentadiene present in the original feed.

The improved method of this invention is illustrated by the following examples:

*Example I*

The following data illustrate the effect of diluent on the recovery and purity of methylcyclopentadiene as a vapor side stream product. In all the runs cyclopentadiene of about 90 weight per cent purity was taken overhead at about 90% recovery:

| Diluent | None | Benzene | Cyclohexene | Ethylene Dichloride |
|---|---|---|---|---|
| Reboiler Temp., (Col. 4), ° C | 168 | 162 | 135 | 131 | 111 |
| Side stream Composit.: | | | | | |
| Methylcyclopentadiene, Wt. Percent | 73.4 | 91.3 | 42 | 46 | 39.1 |
| Cyclopentadiene, Wt. Percent | 6.2 | 4.4 | [1] 0 | [1] 1 | [1] 0.5 |
| C₇ Cyclodienes | 12.5 | 4.3 | 4 | 4 | 3.5 |
| "Fill" Material | 7.9 | | | | |
| Diluent | | | 54 | 49 | 56.9 |
| Wt. Percent Methylcyclopentadiene Recovery Based on Methylcyclopentadiene in Feed | 80 | 55 | 71 | 74 | 77.2 |
| Methylcyclopentadiene Purity on a Solvent-Free Basis, Wt. Percent | | | 91.2 | 90.3 | 90.8 |

[1] Cyclopentadiene has been largely excluded when diluent is used. Recracking in reboiler has been eliminated at lower temperatures.

It should be noted that only in the example where a diluent was utilized was there a recovery of methylcyclopentadiene practically free of cyclopentadiene.

The superior balance of purity and recovery of the products in the examples with the diluents should also be noted.

If desired, reduced pressures may be employed in fractional distillation zone No. 4.

It will be further understood that the foregoing examples have been given merely for purposes of illustration, but that other modifications of the present invention are possible without departing from the scope of the appended claims.

What is claimed is:

1. A process for separating and recovering cyclopentadiene and methylcyclopentadiene contained together as dimers and codimers in a cracked petroleum concentrate, said concentrate having a boiling range of about 130°–280° C., 75% or more boiling in the range of about 170°–225° C. and containing about 20–93 weight per cent cyclopentadiene and methylcyclopentadiene as dimers and codimers, which comprises the steps of thermally treating the concentrate to crack the cyclopentadiene and methylcyclopentadiene dimers and codimers; taking off a low boiling fraction containing predominantly cyclopentadiene and methylcyclopentadiene monomers from the cracking step to a fractionation zone; fractionating this predominantly cyclopentadiene and methylcyclopentadiene fraction in the fractionating zone in the presence of an added inert organic diluent, said diluent boiling in the range of about 80°–110° C. and being present in an amount required to maintain the maximum reboiler temperature in the fractionating zone at about 140° C.; taking overhead a predominantly cyclopentadiene product relatively free of methylcyclopentadiene; taking off as a side stream below the feed point of the fractionating zone a predominantly methylcyclopentadiene fraction containing appreciable amounts of diluent but relatively free of cyclopentadiene; thermally soaking this side stream methylcyclopentadiene fraction so as to dimerize the methylcyclopentadiene; distilling off the diluent therefrom to leave a predominantly pure dimer product; and also withdrawing from the fractionation zone a high boiling bottoms fraction containing diluent and dimers.

2. The process as in claim 1, including the additional steps of distilling off the inert diluent from the withdrawn high boiling bottoms fraction and recycling the diluent to the fractionation step.

3. The process of claim 2 in which the cyclopentadiene and methylcyclopentadiene as dimers and codimers are present in an amount of about 55 to 82 weight per cent.

4. A process as in claim 1, including the additional steps of passing the withdrawn high boiling bottoms fraction to an auxiliary distillation zone, in said auxiliary distillation zone distilling off the inert diluent and recycling it to the aforesaid fractionation zone, also removing by distillation an intermediate fraction boiling between the diluent and the dimers, and recycling the residual dimers and codimers of cyclopentadiene and methylcyclopentadiene to the fractionation step.

5. A process as in claim 4, in which the diluent is cyclohexane and is present in a quantity sufficient to maintain the maximum reboiler temperature in the fractionation zone not above 130° C.

6. A process as in claim 4, in which the diluent is ethylene dichloride and is present in a quantity sufficient to maintain the maximum reboiler temperature in the fractination zone not above 130° C.

References Cited in the file of this patent

UNITED STATES PATENTS

| 2,372,237 | Ward | Mar. 27, 1945 |
| 2,387,993 | Hepp | Oct. 30, 1945 |
| 2,636,056 | Jones | Apr. 21, 1953 |